United States Patent [19]
Inoue et al.

[11] Patent Number: 5,444,844
[45] Date of Patent: Aug. 22, 1995

[54] FIGURE DRAWING APPARATUS AND INVENTORY PURCHASING SYSTEM USING THE SAME

[75] Inventors: Kimio Inoue, Kanagawa; Hisao Tanaka, Tokyo; Toshio Katou, Kanagawa; Masaki Ikeda, Kanagawa; Masao Wakimoto, Kanagawa; Katuhiko Hamamura, Kanagawa, all of Japan

[73] Assignee: NSK Ltd., Tokyo, Japan

[21] Appl. No.: 302,379

[22] Filed: Sep. 8, 1994

Related U.S. Application Data

[63] Continuation of Ser. No. 892,997, Jun. 3, 1992, abandoned.

[30] Foreign Application Priority Data

Jun. 4, 1991 [JP] Japan ................... 3-132791

[51] Int. Cl.⁶ .............................................. G06F 3/00
[52] U.S. Cl. .................... 395/161; 395/600; 364/403
[58] Field of Search ............ 395/155–161, 395/608, 133; 345/179, 117–120, 156–157, 162, 902; 178/17–18; 364/474.4–474.24, 488–491, 401–403

[56] References Cited

U.S. PATENT DOCUMENTS

| | | | |
|---|---|---|---|
| 4,716,542 | 12/1987 | Peltz et al. | 395/173 |
| 4,813,013 | 3/1989 | Dunn | 395/159 |
| 4,868,766 | 9/1989 | Oosterholt | 395/156 X |
| 4,931,783 | 6/1990 | Atkinson | 395/156 |
| 5,006,991 | 4/1991 | Ohcoshi et al. | 364/474.2 |
| 5,197,120 | 3/1993 | Saxton et al. | 395/156 X |
| 5,237,647 | 8/1993 | Roberts et al. | 345/133 |
| 5,319,542 | 6/1994 | King, Jr. et al. | 364/401 |

FOREIGN PATENT DOCUMENTS

| | | | |
|---|---|---|---|
| 0153747 | 9/1985 | European Pat. Off. | G06F 15/72 B |
| 0379458 | 7/1990 | European Pat. Off. | G06F 15/72 |
| 2598000 | 4/1987 | France | G06F 9/44 |
| 2190268 | 4/1987 | United Kingdom | G06F 15/60 |
| WO8803290 | 5/1988 | WIPO | G06F 3/033 A |

OTHER PUBLICATIONS

Barzaghi et al, "An Object–Oriented Framework for the Design of VLSI Cells", IEEE Proceedings, Aug. 1990, pp. 100–103.

Cornelis et al, "Database Support for Engineering CAD and Simulation", IEEE Conf., Oct. 1989, pp. 38–48.

Wakimoto et al, "An Intelligent User Interface to an Image Database Using a Figure Interpretation Method", IEEE Proceedings, Jun. 1990, pp. 516–520.

Easy CAD, v. 1.08, Evolution Computing, 1987, pp. 29–41, 63–74, 165–172, 177–251, 253–265.

Rosenberg, "Dictionary of Computers, Information Processing & Telecommunications", 1987, pp. 144–145.

Microsoft Paintbrush, Microsoft Corp., 1986, pp. 66–69.

D. Livingston, "Navy signals for CIM," Systems Integration, Jan. 1990, pp. 54–58.

Primary Examiner—Mark R. Powell
Assistant Examiner—John E. Breene
Attorney, Agent, or Firm—Sughrue, Mion, Zinn, Macpeak & Seas

[57] ABSTRACT

In order to provide an automatic figure drawing apparatus in which erroneous figure drawing can be prevented, neither a large-capacity magnetic disk nor a number of floppy disks is required, and management and operation can be performed easily by integrating a parametric system storing various CAD (Computer Aided Drafting) figures and an inventory control system. An automatic figure drawing apparatus provides a data selection device for selecting figure drawing data of an figure, on the basis of assignment data, from memory in which a data base of various dimensions of predetermined figure drawing subjects is built, and a figure drawing information production device for supplying figure drawing information of a parametric system to a figure drawing output device on the basis of the selected figure drawing data. Thereby, it is possible to prevent mistakes from being produced by a user selecting catalog data in a book.

2 Claims, 7 Drawing Sheets

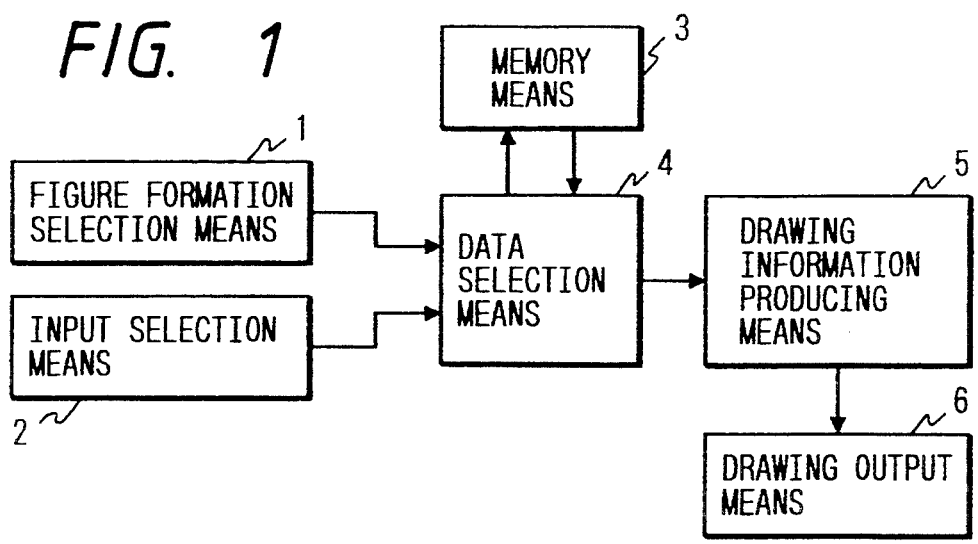
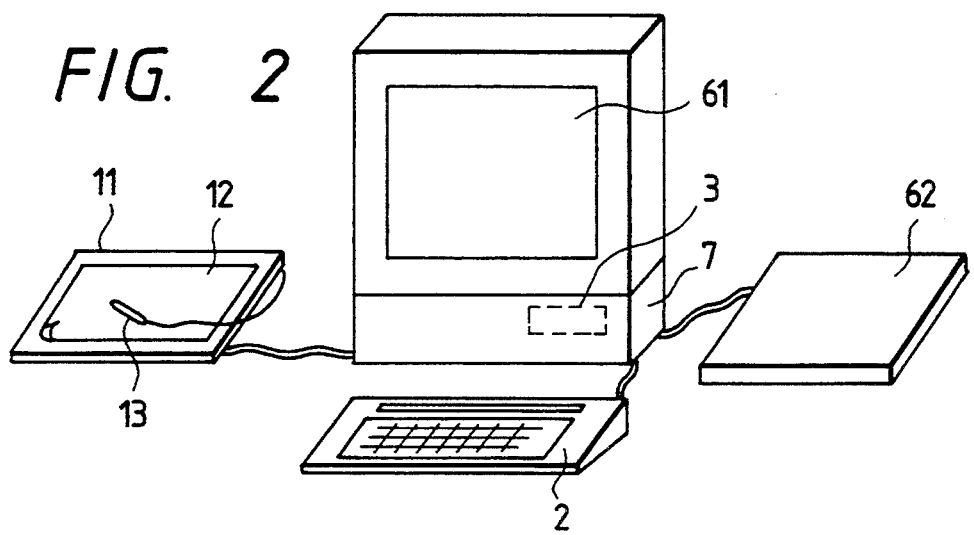
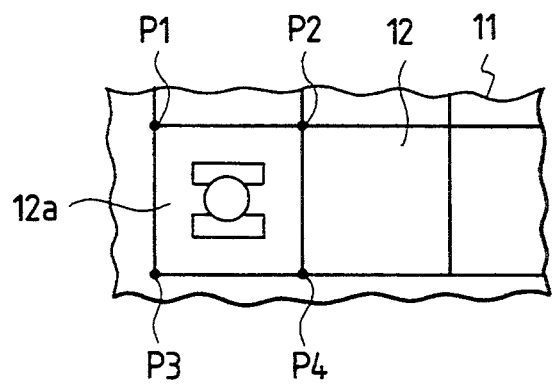

FIG. 6(a)

| ⟨CJP⟩ | | | ⟨CXS⟩ | | | | | |
|---|---|---|---|---|---|---|---|---|
| | | | | | | ⟨CY1⟩ | ⟨CXS⟩ | |
| | | | | | | ⟨MYH⟩ | | |
| | | | | | | ⟨MYC⟩ | | |
| φ6–16 | φ20–40 | φ40–100 | φ20–100 | φ12–100 | | | | |
| ⟨CJ2⟩ | ⟨CM2⟩ | ⟨CA1⟩ | ⟨CG1⟩ | ⟨CQ2⟩ | | | ⟨CXW⟩ | ⟨AS⟩ |

ELECTRONIC CATALOG OF B COMPANY

FIG. 6(b)

ELECTRONIC CATALOG OF C COMPANY

FIG. 6(c)

| ⟨SSA⟩ ⟨SSAY⟩ | S45C | | | | ⟨SWG⟩ | ⟨SW⟩ |
|---|---|---|---|---|---|---|
| ⟨SSG⟩ | ⟨SRH⟩ | ⟨SMS⟩ | ⟨SBS⟩ | AlBC ⟨AG⟩ | BC ⟨BG⟩ |
| ⟨SS⟩ ⟨SSY⟩ | ⟨SH⟩ | ⟨SR⟩ | ⟨SM⟩ | ⟨SB⟩ | ⟨SN⟩ | FC20 ⟨CG⟩ |

ELECTRONIC CATALOG OF D COMPANY

FIGURE DRAWING APPARATUS AND INVENTORY PURCHASING SYSTEM USING THE SAME

This is a Continuation of application Ser. No. 07/892,997 filed Jun. 3, 1992, now abandoned.

BACKGROUND OF THE INVENTION

The present invention relates to an automatic figure drawing apparatus and method, and particularly relates to an automatic figure drawing apparatus and method in a computer aided design system (hereinafter abbreviated as "CAD system").

CAD (Computer Aided Design) is an art which has the purposes of making design high in speed, high in quality, and so on. In a CAD system, in order to attain these objectives, it is important to make automatic figure drawing efficient by re-using figure data and using standard parts figure data.

FIGS. 9(a)-(c) are block system diagrams illustrating a conventional automatic figure drawing apparatus.

FIG. 9(a) shows an apparatus for figure drawing by a parametric system, in which data described in a book or the like, such as inner and outer diameters, width, etc. of a bearing are put into a CAD system, and automatic figure drawing is performed in accordance with a drawing program of this CAD system. There have been problems in this case in that if erroneous data is put into a CAD system, an erroneous figure is drawn on the basis of the erroneous data, and in that it is troublesome to input data in accordance with the order of a predetermined format.

The figure drawing by a parametric system is that in which, for example, a parallelogram is expressed by variables a, b and $\alpha$ as shown in FIG. 8(c); a regular square being expressed if a=b and $\alpha=90°$, a rectangle being expressed if a b and $\alpha=90°$, a parallelogram being expressed if a b and $\alpha$ 90°. Thus, various quadrilaterals different in kind or size can be expressed in accordance with the variables a, b and $\alpha$. There is another figure drawing system, which is called a vector data system. This is a system to express a regular square and a regular triangle by variables a' and b' as shown in FIGS. 8(a) and 8(b) respectively; the variable a' can express only a regular square, while the variable b' can express only a regular triangle. That is, for example, if a rectangle is to be expressed, other variables, such as x and y are used. In the above-mentioned example of quadrilaterals, this system has co-ordinates of start and end points of respective lines as data; in the regular square in FIG. 8(a), its four sides are expressed by co-ordinates a1, a2, a3 and a4 of the constant a', and in the quadrilateral in FIG. 8(c), its four sides are expressed by co-ordinates b1, b2, b3 and b4. Those co-ordinates vary if the size of the figure vary.

Being different from a figure drawing method using a figure drawing program as shown in FIG. 9(a), a figure drawing method shown in FIG. 9(b) is such that necessary data is selected, by inputting a command, from figure data (so-called electronic catalog data) stored in advance in a memory means such as a magnetic disk in which a data base is built. Being different from the case where a person reads catalog data values in a book and inputs the read-out catalog data values into a CAD system as shown in FIG. 9(a), figure data entry error is less because of the electronic catalog data on a magnetic medium. There are however problems in that all the necessary figure data must be stored on a magnetic medium, so that a magnetic disk having a large capacity is required which thereby results in a disadvantage in cost and space, and in the case of using floppy disks, the number of the disks becomes large which results in combersome management thereof.

A figure drawing method shown in FIG. 9(c) is a method in which figure data for CAD is produced by a figure drawing program of a parametric system having a data base which is not running on CAD, and the figure data are read into a CAD system to perform figure drawing. In the method, therefore, there has been a problem of troublesome operation in that another CAD system is required and switching is also necessary.

SUMMARY OF THE INVENTION

The present invention has been executed under the foregoing circumstances, and an object thereof is to provide an automatic figure drawing apparatus in which erroneous figure drawing can be prevented, neither a large-capacity magnetic disk nor a large number of floppy disks is required, and management and operation are easy.

In order to attain the foregoing objective, according to a first aspect of the present invention, as shown in FIG. 1, an automatic figure drawing apparatus for performing automatic designing comprises a figure formation selection means for selecting a figure drawing subject in accordance with a position instruction on a figure drawing menu and an input selection means for selecting assignment data for assigning an object to be drawn in the figure drawing subject, there are further provided a data selection means for selecting figure drawing data of the object on the basis of the assignment data from a memory means in which a data base of predetermined figure drawing subjects is built, and a drawing information production means for supplying figure drawing information of a parametric system to a figure drawing output means on the basis of the selected figure drawing data.

Further, according to a second aspect of the present invention, the automatic figure drawing method comprises the steps of first selecting a figure drawing subject in accordance with a position instruction on a figure drawing menu; second selecting assignment data for assigning an object to be drawn in the figure drawing subject; third selecting figure drawing data of the object on the basis of the assignment data from a memory means in which a data base of predetermined figure drawing subjects is built; and supplying figure drawing information of a parametric system to a figure drawing output means on the basis of the selected figure drawing data.

In the automatic figure drawing apparatus and method according to the present invention, desired figure drawing data are selected from the data base built in the memory means, and a figure is drawn in accordance with the parametric system.

BRIEF DESCRIPTION OF THE DRAWINGS

FIG. 1 is a block system diagram for explaining the constitution of the present invention.

FIG. 2 is a constituent diagram illustrating an embodiment of the automatic figure drawing apparatus according to the present invention.

FIG. 5 is a schematic illustration of a region of an exchangeable electronic catalog portion in the tablet menu of FIG. 4.

FIGS. 6(a)–6(c) are examples of exchangeable electronic catalog portions of a figure drawing menu in FIG. 4.

DETAILED DESCRIPTION OF THE PREFERRED EMBODIMENTS

Figure 3:
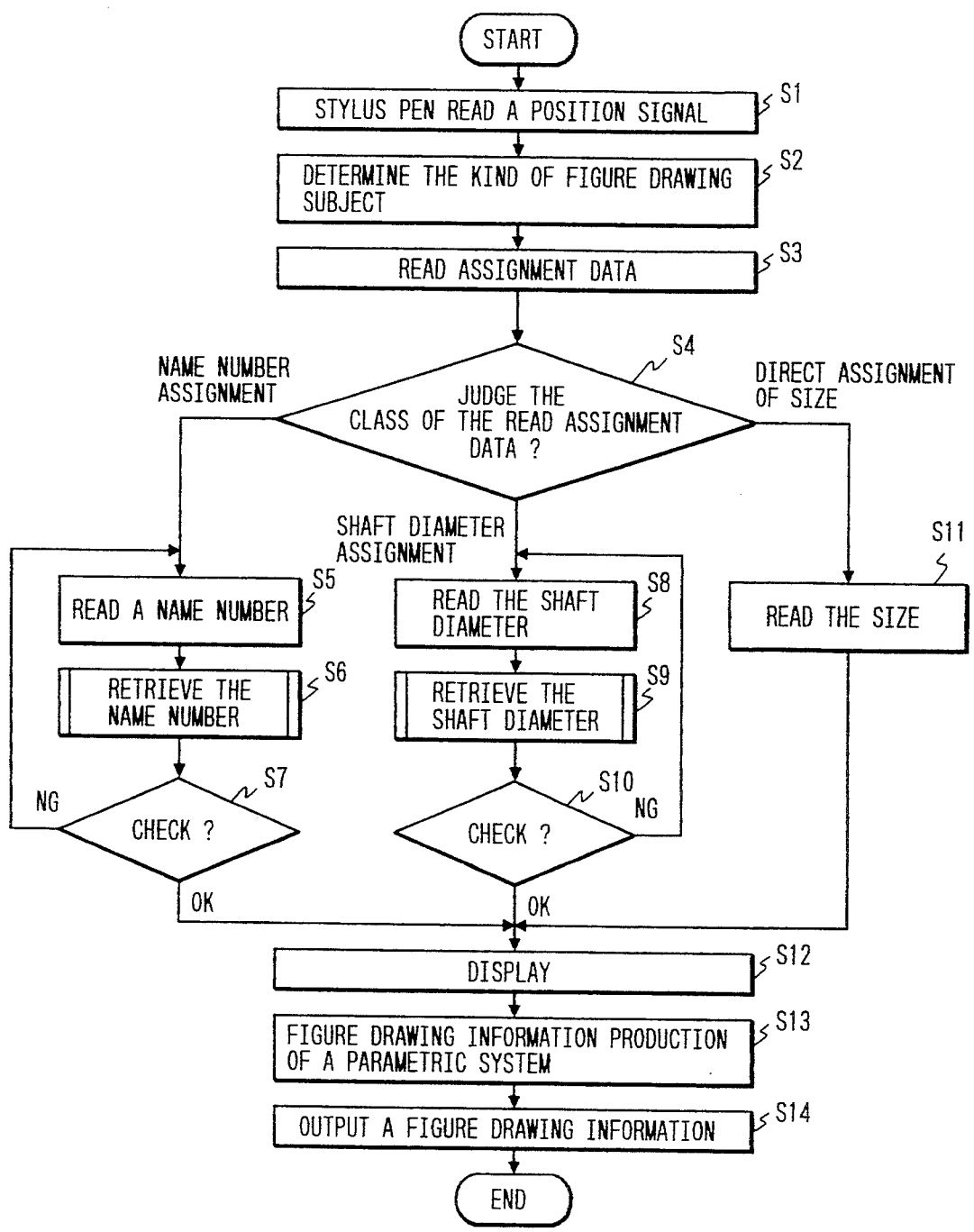
FIG. 3 is a flow chart for explaining the operation of the apparatus of FIG. 2.

An embodiment of the present invention will be described with reference to the drawings.

FIG. 2 is a configuration diagram illustrating an automatic figure drawing apparatus according to the present invention, and in FIG. 2, the reference numerals 11 to 13 represent a digitizer (tablet), a tablet menu sheet, and a stylus pen which constitute a figure drawing selection means, and 2 represents a keyboard which acts as an input selection means. In addition, the reference numeral 7 represents a microcomputer having a memory means 3, a data selection means 4 and a figure drawing information production means 5 which are shown in FIG. 1, and 61 and 62 represent a CRT display and a printer respectively which act as a figure drawing output means 6. The microcomputer 7 has a floppy disk 3 which acts as the memory means shown in FIG. 1.

Figure 4:
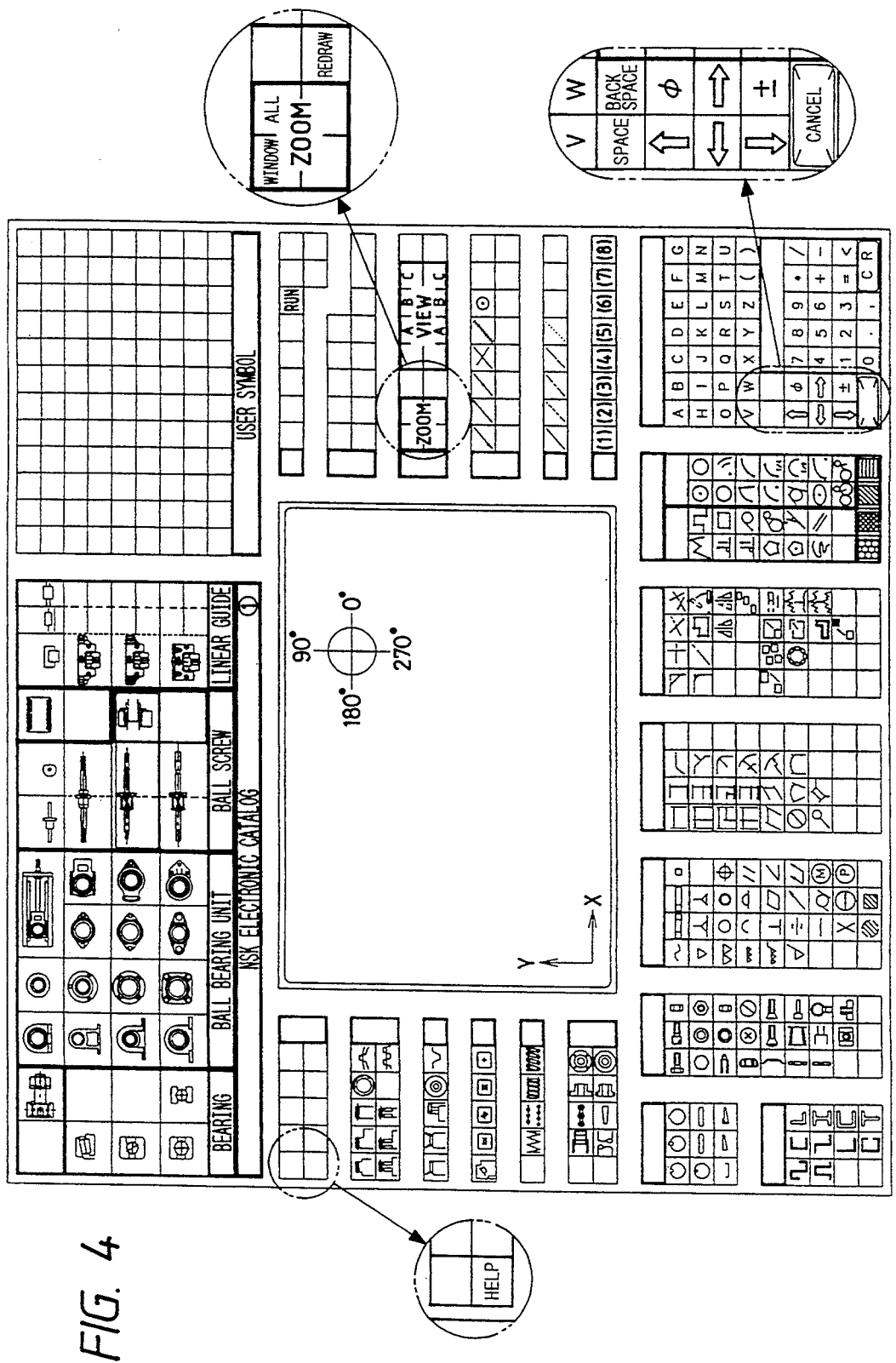
FIG. 4 is an overview illustrating an example of a tablet menu used in the apparatus of FIG. 2.

Next, the operation of the microcomputer 7 of FIG. 2 will be described by using the flow chart of FIG. 3. First, the micro computer 7 reads a position signal indicating a position on a schematic symbol of an exchangeable electronic catalog portion included in a figure drawing menu (tablet menu sheet 12) on the digitizer 11 indicated by the stylus pen 13 constituting the figure drawing selection means (Step S1). Next, the microcomputer 7 determines the kind of figure drawing subject from the read position signal (Step S2). An example of the tablet menu is shown in FIG. 4, and its partially expanded diagram is shown in FIG. 5. In the example of the tablet menu in FIG. 4, titles of command groups are all positioned in the outer circumference of a working area so that it is possible for a beginner to find a desired command easily by only looking over the outer circumference of the working area. In addition, a portion of the electronic catalog is made exchangeable so that each maker can select its specific data base for respective parts to make it possible for the electronic catalog to have generality. Examples of exchanged electronic catalogs thereof are shown in FIGS. 6(a) to 6(c). If a certain point in an inner area 12a of the positions P1 to P4 (the point may be any point so long as it exists within the inner area 12a) is indicated by the stylus pen 13, a bearing corresponding to the inner area 12a including the indicated point is selected. A bearing corresponding to the inner area 12a in FIG. 5 is a single-row deep-groove ball bearing, and if any point within the inner area 12a is indicated by the stylus pen 13, the single-row deep-groove ball bearing is selected. As the bearings which may be figure drawing subjects, other than the single-row deep-groove ball, there are a single-row angular ball bearing, a tapered roller bearing, a thrust ball bearing with flat seats, a cam follower, a ball bearing unit (pillow-type, flange-type, take-up-type, and cartridge-type), and so on. A product to be drawn as a figure can be indicated easily by this selection, and the product is not limited to such a bearing. That is, a bearing may be replaced by desired product, such as a gear, a pulley, a spring, a flange, a motor, or the like.

Next, the microcomputer 7 reads the assignment data from the keyboard 2 which acts as the input selection means (Step S3), and judges the class of the read assignment data (Step S4). If the class of the assignment data is a part number assignment, a part number is also read (Step S5). The data selection means of the microcomputer 7 selects and retrieves the figure drawing data of a bearing of the part number from the data base in the floppy disk 3 which acts as the memory means (Step S6), and next, checks the part number (Step S7). In the part number check, check is made as to whether the assigned part number is coincident with the part number selected from the data base or not. If not coincident (NG), the microcomputer 7 returns to Step S4, and reads a part number again.

If the class of the assignment data is a shaft diameter size (inner and outer diameters of a bearing) in Step S4, the micro computer 7 reads the values of the shaft diameter size (Step S8), selects and retrieves figure drawing data of a bearing of those shaft diameter size values from the data base of the floppy disk 3 (Step S9), and next, checks the shaft diameter size values (Step S10). In the shaft diameter size check, check is made as to whether the assigned shaft diameter size values are coincident with the selected shaft diameter size values or not. If not coincident (NG), the microcomputer 7 returns to Step S8, and reads assigned shaft diameter size values again. Since the above-mentioned data base stores data of a parametric system necessary for figure drawing correspondingly to assigned name numbers, assigned shaft diameter size values, the retrieved data is carried to Steps S12 to S14.

If the class of assignment data is a direct assignment of size in Step S4, the microcomputer 7 reads, for example, respective size values of bearing inner and outer diameters, bearing width, and chamfering. In this case, the microcomputer 7 moves to Steps S12 to S14 without checking them.

If the assigned data values are coincident with the figure drawing data values from the data base in the above-mentioned Step S7 and S10 (OK), the microcomputer 7 moves to Steps S12 to S14.

In Step S12, the respective various dimension data are supplied to the CRT display 61 or the printer 62 in order to allow confirmation as to whether the data selected as a figure drawing subject is correct or not.

A program for reception of data of the parametric system and for making a figure drawing based on the data is stored in the figure drawing information production means of the microcomputer 7. A figure is drawn in accordance with this program (Step S13), and supplied to the CRT display 61 or the printer 62 as a figure drawing output means (Step S14).

Next, the operation of the apparatus of FIG. 2 will be described. The digitizer 11 and the stylus pen 13 supply a position signal indicating a position to the microcomputer 7. The microcomputer 7 determines the kind of the figure drawing subject (for example, a type of a bearing type, such as a single-row deep-groove ball bearing, a single-row angular ball bearing, etc. in the case of a bearing) on the basis of the position signal. Next, the microcomputer 7 reads the assignment data (for example, the part number or the shaft diameter size d) inputted through the keyboard 8 to determine the figure drawing subject (for example, a single-row deep-groove ball bearing of the call number (part number) 6,800 or a single-row deep-groove ball bearing of the shaft diameter size d=10 mm) in the figure drawing subject (for example, a single-row deep-groove ball bearing) selected by the digitizer 11 and the stylus pen 13. Next, the microcomputer 7 reads a part number, a shaft diameter size value or necessary size values on the basis of the assignment data, and in the case of reading a name number or a shaft diameter size value, the microcomputer 7 selects figure drawing data of a bearing of the part number or the shaft diameter size value from the data base of the floppy disk 3, and checks the part number or the shaft diameter size value on the basis of the figure drawing data. If "OK" in the checking of the part number or shaft diameter size, or if necessary size values are read, the microcomputer 7 produces figure drawing information of a parametric system in accordance with a figure drawing program of the parametric system on the basis of the figure drawing data, and supplies the figure drawing information and various dimension data to the CRT display 61 or the printer 62. Various dimension sizes, basic standard loads, allowable rotation numbers, etc. of respective kinds of bearings are filed as numerical data of the parametric system in the data base of the floppy disk 3.

Although a kind of figure drawing subject is specified by the tablet and the stylus pen in the above-mentioned embodiment, the present invention is not limited to this, and a kind of figure drawing subject may be specified by a CRT display and a mouse. In addition, although the microcomputer 7 returns to Step S5 or S8 if "NG" in Step S7 or S10 in FIG. 3, the microcomputer 7 may return to Step S3 whenever "NG" in Step S7 or S10, thereby relieving input errors of assignment data in Step S3. Further, although figure drawing information in Step S13 is supplied to the CRT display 61 or the printer 62, it may be supplied to a plotter, thereby drawing a figure on a figure drawing sheet. Further, although various dimension data of a figure drawing subject are displayed on the CRT display 61 or the printer 62 in Step S14, assigned size values (for example, inner and outer diameter values of a bearing) on the basis of assignment data may be also displayed to thereby be compared with output values from a data base. Further a figure may be displayed on the CRT display 61.

Figure 7:
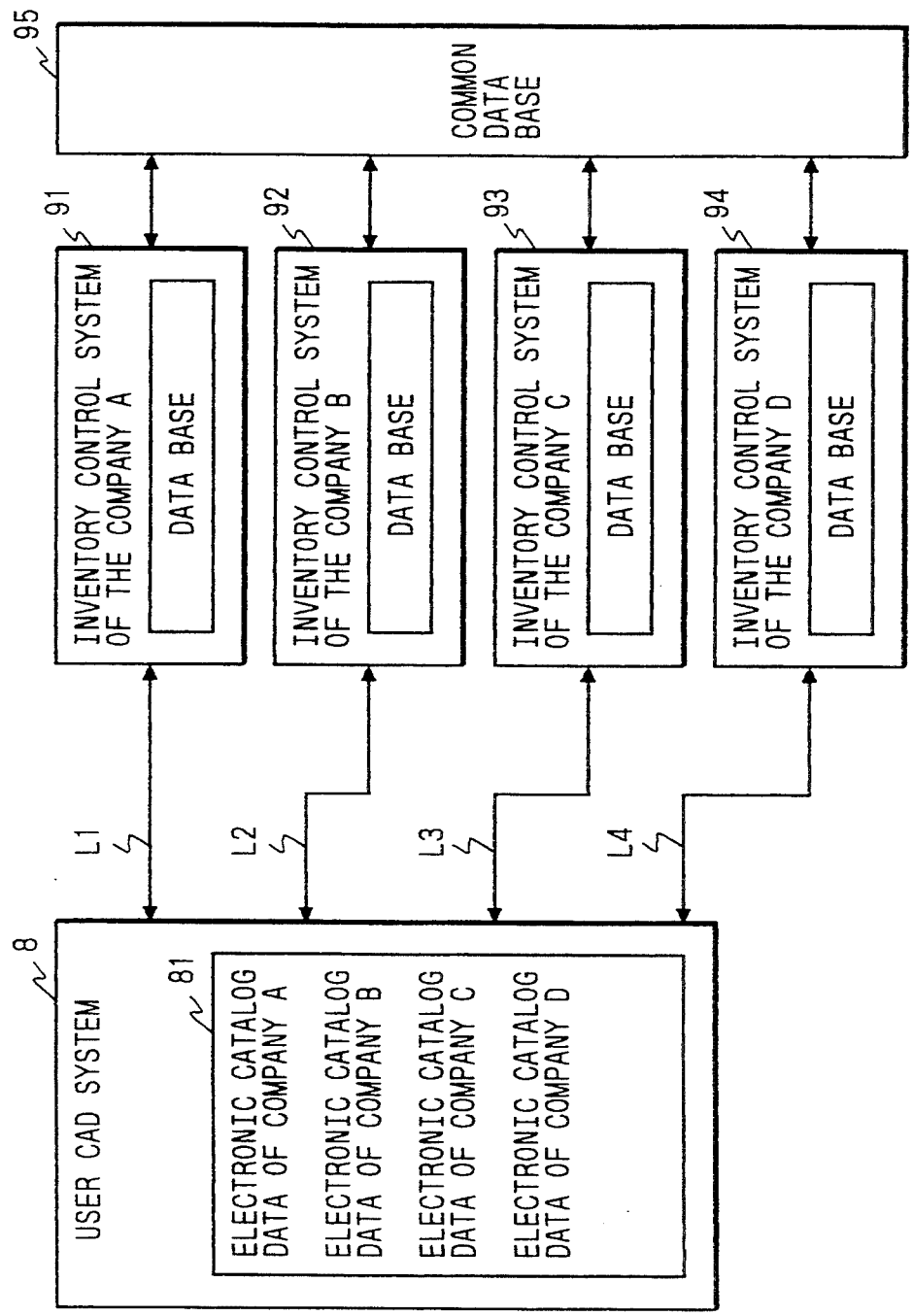
FIG. 7 is a block system diagram illustrating a modification of a CAD system including an embodiment of the automatic figure drawing apparatus according to an embodiment of the present invention.
Figure 8A:
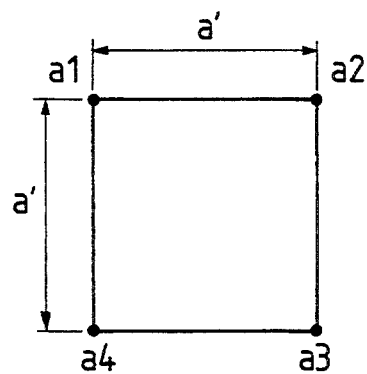
FIG. 8 is a diagram for explaining a parametric system and a vector data system.
Figure 8B:
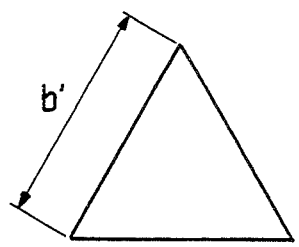
Figure 8C:
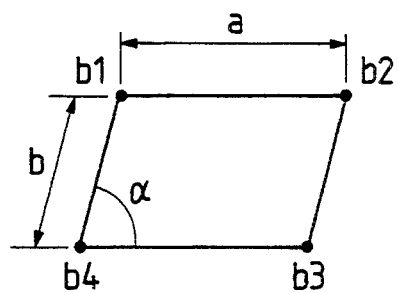
Figure 9A:
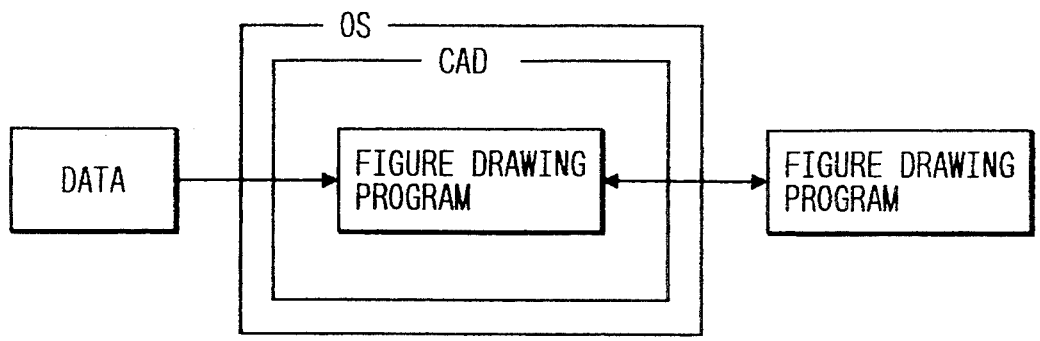
FIG. 9 is a block system diagram illustrating a conventional automatic figure drawing apparatus.
Figure 9B:
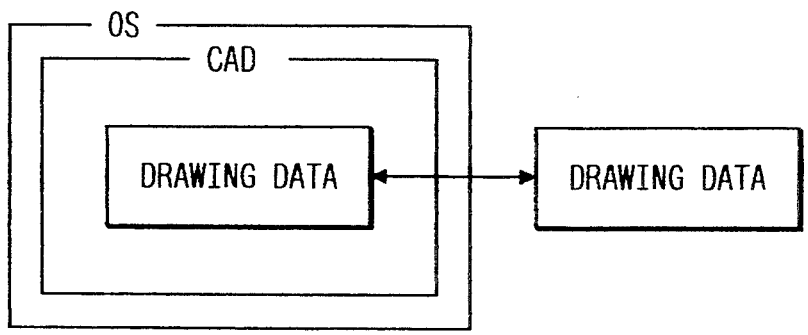
Figure 9C:
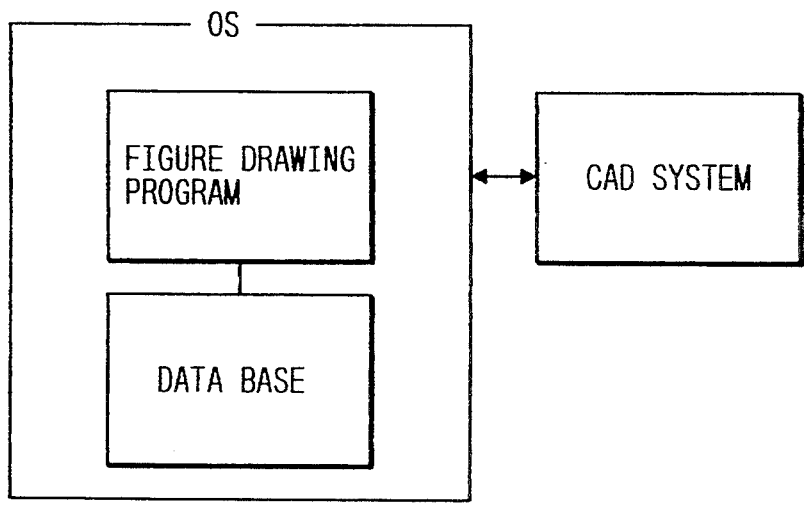

FIG. 7 is a block system diagram illustrating a modification of a CAD system including an embodiment of an automatic figure drawing apparatus according to the present invention. In FIG. 7, the reference numeral 8 represents a user CAD system in which a data base 81 including parametric-system electronic catalog data of companies A to D is built. The user CAD system 8 is the automatic figure drawing apparatus according to the present invention which has been described above by using the FIGS. 1 to 5. The CAD system 8 is connected to inventory control systems 91 to 94 of the respective companies A to D through communication lines L1 to L4 respectively. Data bases for inventory control are built in the respective inventory control systems.

The data base for inventory control of all the companies A to D is made so as to be possessed by each company. Thus, for example, a user who uses the user CAD system 8 can confirm the inventory contents (such as the number, the price and the time of delivery) of a desired part through the line L1 to the company A, so that the user can order the part while drawing a figure of the part, can know which company is storing the part (for example, a bearing), and can immediately know from which company the part is ordered.

In addition, if a common data base 95 is provided as shown in FIG. 7, any product made by any maker can be obtained by ordering it from one of makers, if the maker is in the electronic catalog registered in the CAD system 8. For example, in the case of purchasing products of the companies B and C, a user can obtain all the products of both the companies B and C if he orders them from either one of the companies B or C. Consequently it is possible to realize an electronic catalog by one common data base 95 without providing special data bases for respective companies, so that it is possible to perform inexpensively the inventory control and CAD system running.

Next, the operation of the system in FIG. 7 will be described. When a user purchases, for example, a bearing BA of the company A, the user transmits data (for example, the part number and type) of the bearing BA necessary for purchase to the inventory control system 91 of the company A through the line L1, so that the company A knows the bearing BA is required by the user from the input data of the bearing BA. For example, the data to be transmitted by the user may be a bearing name number which has been given the "OK" by the check in Step S5, or may be a shaft diameter size which has been given the "OK" by the check in Step S9. That is, the name number or the shaft diameter size given the "OK" by the check may be transmitted through the line L1 to the inventory control system 91 of the company A in the next step (not-shown). In addition, if a user wants to purchase a slightly modified one of the bearing BA selected from the data base 81, a step for modifying a figure may be provided next to Steps S5 and S9 for check, thereby transmitting various dimension data, figure drawing data and so on of this modified bearing to the inventory control system 91 of the company A so as to ask whether the bearing can be purchased.

As has been described, by combining a CAD system and an inventory control system on line, it is easier and more accurate to purchase parts.

As has been described, according to the present invention, in the automatic figure drawing apparatus for performing automatic designing comprising a figure formation selection means for selecting a figure drawing subject in accordance with a position instruction on a figure drawing menu and an input selection means for selecting assignment data for assigning an object to be drawn in the figure drawing subject, there are further provided a data selection means for selecting figure drawing data of the object on the basis of the assignment data from a memory means in which a data base of predetermined figure drawing subjects is built, and a drawing information production means for supplying figure drawing information of a parametric system to a figure drawing output means on the basis of the selected figure drawing data. Accordingly, mistakes can be prevented from being produced when a person selects data from catalog data in a book because figure drawing data can be selected from the data base, and a large-capacity magnetic disk or a number of floppy disks are not necessary because a parametric system is employed to draw a number of figures in accordance with a figure drawing program which is smaller than that of a vector data system, so that management and operation can be performed easily.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. An inventory purchase system using a figure drawing apparatus, comprising:
    a figure drawing apparatus comprising:
        a figure drawing menu including at least one schematic symbol of an electronic catalog portion,
        a figure formation selection means for selecting a figure drawing subject to be drawn in accordance with a positional instruction corresponding to one of said schematic symbols of said electronic catalog portion,
        an input selection means for selecting assignment data which corresponds to figure drawing data,
        a memory device for storing the figure drawing data so that a first data base is formed with numerical data of a parametric system corresponding to said assignment data,
        a data selection means for selecting said figure drawing data based on said assignment data from said first data base formed in said memory device, and
        a drawing information production means for producing display data for drawing a figure by the parametric system in accordance with said figure drawing data; and
    an inventory purchase apparatus including a second data base storing inventory contents information of said figure drawing subject,
    wherein said automatic figure drawing apparatus is connected with said inventory purchase system through an online communication link in such a manner that order information of said subject can be transmitted and received through the online communication link while a figure of said subject is drawn with said automatic figure drawing apparatus.

2. The inventory purchase system according to claim 1, wherein said inventory purchase apparatus comprises a common data base storing data, which is owned by companies producing electronic catalogs to be commonly stored for a plurality of inventory items.

* * * * *